United States Patent [19]
Linder

[11] 3,781,082
[45] Dec. 25, 1973

[54] REFLECTOR MOUNT FOR SPOKED WHEEL

[75] Inventor: Henry Linder, Wood Dale, Ill.

[73] Assignee: Beatrice Foods Co., Chicago, Ill.

[22] Filed: July 31, 1972

[21] Appl. No.: 276,452

Related U.S. Application Data

[63] Continuation-in-part of Ser. No. 254,950, May 19, 1972, abandoned, which is a continuation-in-part of Ser. No. 228,178, Feb. 22, 1972.

[52] U.S. Cl. .................................. 350/99, 350/97
[51] Int. Cl. ............................................ G02b 5/12
[58] Field of Search ..................... 350/97, 99, 102, 350/103, 109, 307, 288, 299

[56] References Cited
UNITED STATES PATENTS 2,344,542  3/1944  Fike ..................................... 350/99
3,684,347  8/1972  Challe ................................. 350/97

FOREIGN PATENTS OR APPLICATIONS 766,704  1/1957  Great Britain ....................... 350/99

Primary Examiner—Ronald L. Wibert
Assistant Examiner—Michael J. Tokar
Attorney—Sominik, Knechtel & Godula

[57] ABSTRACT

Side reflectors mountable between adjacent spokes of a bicycle wheel, each reflector having an obverse side with a reflector element and a reverse side with frictional locking tabs formed at opposite ends. Closely dimensioned locking spaces are between the tabs and the reverse side of the plate so that adjacent bicycle spokes may be captured within the spaces. The adjacent spokes urge portions of the locking tabs away from the reverse side of the plate, and thereby assume frictional locking engagement with the reflector.

10 Claims, 13 Drawing Figures

PATENTED DEC 25 1973 3,781,082

PATENTED DEC 25 1973  3,781,082
SHEET 2 OF 3

3,781,082

REFLECTOR MOUNT FOR SPOKED WHEEL

This invention relates to a side marker mount for a bicycle wheel, and the invention particularly relates to a reflector mount which frictionally engages the adjacent spokes of a bicycle wheel. This application is a continuation-in-part of Ser. No. 254,950, filed May 19, 1972, now abandoned which application is a continuation-in-part of Ser. No. 228,175, filed Feb. 22, 1972, all by the same applicant.

Various reflectors have been mounted on bicycle fenders, handle bars, and other parts of the bicycle. Such reflectors have been adopted to meet purposes of both safety and attractiveness. So far as has been determined, the art has not presented a reflector part which can be efficiently mounted to the spokes of a bicycle wheel.

The same reasons of safety and attractiveness prescribe that such a side marker or bicycle wheel reflector would be well received. Federal specifications now in effect require "side lighting" on trucks and automobiles. Such "side lighting" is attained by using various optic and reflector elements on the sides of these vehicles. These reflectors are variously mounted to the sides of the vehicles, with or without brackets. Such reflectors are well known in this art and may be of the reflex reflector type, including cube corner reflectors. The elements may be comprised entirely of reflector elements or be comprised of both optic and reflector elements.

It is desirable to provide side reflex illumination so as to provide protection to the user of the bicycle in a manner similar to the user of the automobile and truck. The bicycles commonly operated provide frontal illumination with an electric fender light, and rear fender illumination with eflex reflectors. It will be appreciated that the best location for providing side marker illuminations is one or both bicycle wheels.

Once this desired feature in the bicycle art is recognized, it becomes apparent that one important object of the invention is to provide an improved reflector element or assembly which can be mounted on the sides of bicycle wheels. It is a more particular feature of the present invention to provide such an element or assembly which can be mounted in a quick and reliable manner between adjacent spokes of the bicycle wheel.

Another important object of the present invention is to provide a reflector mount which can be economically manufactured through a preferred plastic molding process while still providing efficient and reliable means for directly mounting the device from between adjacent spokes of a bicycle.

Yet another important object of the invention is to provide a reflector device for mounting between adjacent spokes of a bicycle wheel which can be plastic molded to provide an integral plate, with or without an integrally molded reflector element, and integrally molded frictional locking means which can be simply and reliably positioned to capture adjacent spokes of a bicycle wheel in an improved way.

Still yet another important object of the invention is to provide a reflector device for mounting onto adjacent spokes of a bicycle wheel, said reflector device having reflector elements on opposite sides of a backer plate, and said backer plate having mounting means for quickly and securely engaging the adjacent spokes of the bicycle wheel.

Yet still another important object of the invention is to provide a reflector device for mounting onto adjacent spokes of a bicycle wheel through yieldable mounting means on a backer plate so that said reflector device cannot thereafter be removed without extraordinary manipulation.

The objects just described are now attained, together with similar or related objects, by the invention of the present disclosure which includes drawings, wherein.

The use of the same numerals in the various views of the drawings will indicate a reference to like parts, elements, or relationships, as the case may be.

Figure 1:
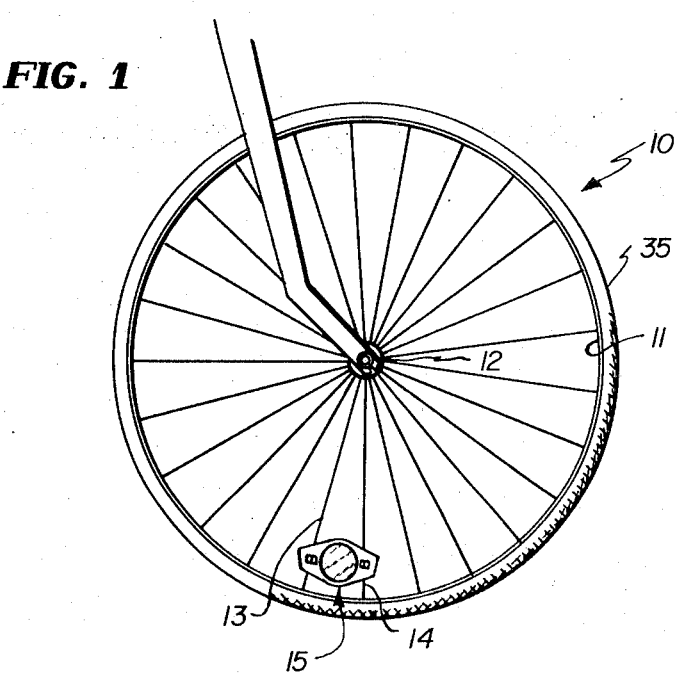
FIG. 1 is a side elevational view of a bicycle wheel showing the reflector device mounted between adjacent spokes.
Figure 6:
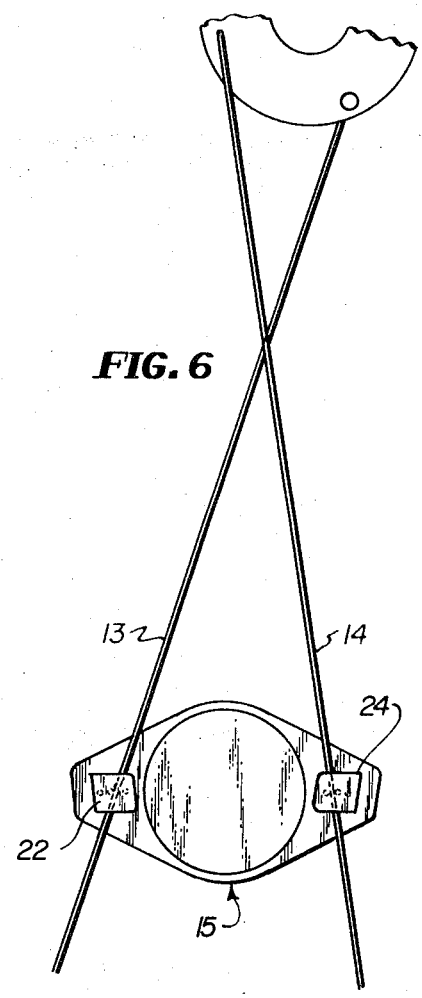
FIG. 6 is an elevational view of the reverse side of the reflector mounted between adjacent spokes.
Figure 3:
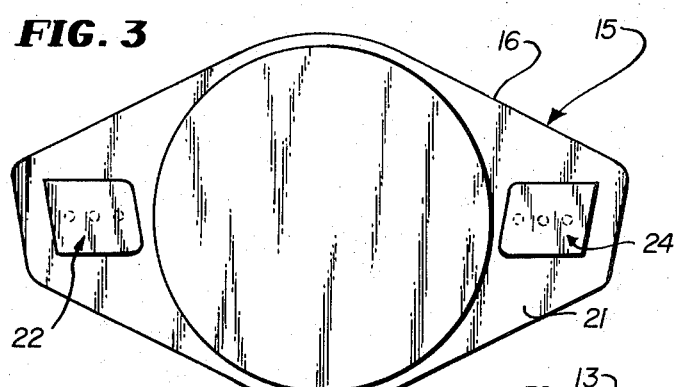
FIG. 3 is a rear elevational view of the device shown in FIG. 2.
Figure 5:
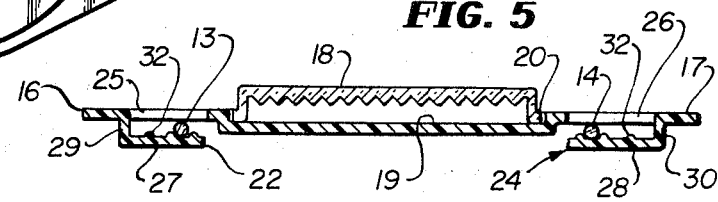
FIG. 5 is a view, partly in section, taken along line 5—5 of FIG. 2.
Figure 2:
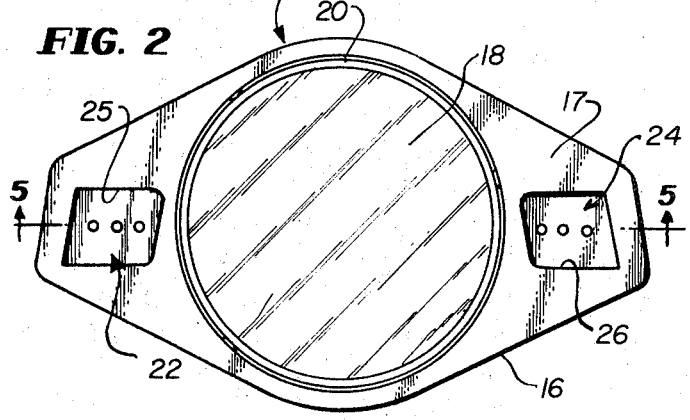
FIG. 2 is a front elevational view of the reflector device, on a larger scale than that shown mounted to the wheel in FIG. 1.
Figure 4:
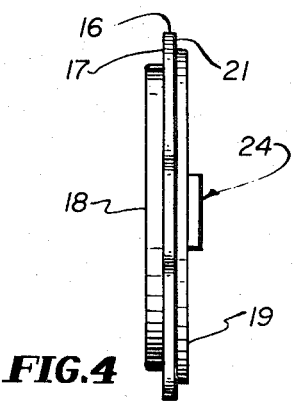
FIG. 4 is an end elevational view of the device shown in FIGS. 2 and 3.
Figure 7:
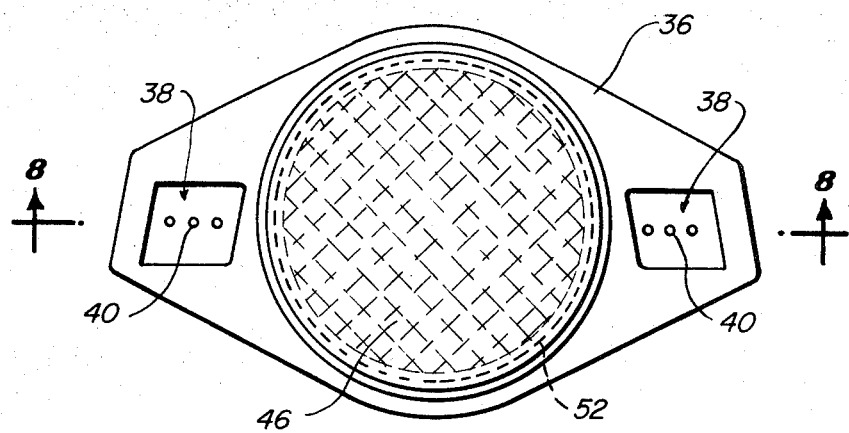
FIG. 7 is a side elevational view of an alternative reflector device having reflector elements on opposite sides.
Figure 8:
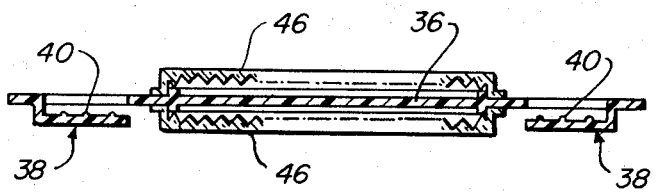
FIG. 8 is a sectional view taken along lines 8—8 of FIG. 7.
Figure 9:
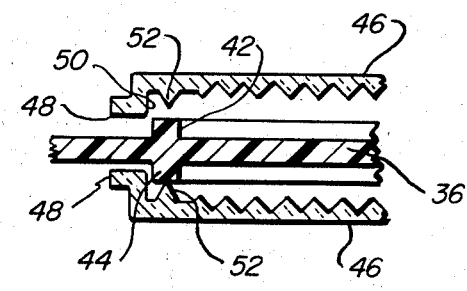
FIG. 9 is a proportional side elevational view in section showing the reflector elements prior to bonding to a backer.

The bicycle wheel 10 shown in FIG. 1 has the customary rim 11, and hub 12, and inflated tire 35. A plurality of spokes crisscross from the hub toward the rim in the usual way, and one pair of adjoining spoked 13, 14 are identified. Such spokes diverge outwardly from the hub towards the rim in the usual way.

A reflector device 15 is shown mounted between the adjoining spokes 13, 14. The illustrated device is shown with elongated mounting or backer plate 16. The plate 16 has an obverse side 17 on which a reflex reflector 18 is shown mounted. The obverse side is shown with a well or socket 19 dimensioned to closely receive annular flange 20 of the reflector, the height of the flange corresponding to the depth of the well for flush fit. The reflector is preferably bonded to the backer plate 16 through sonic sealing by passing the plate and seated reflector under a sonic horn, conventionally used for such purposes. Other bonding means may be used, such as double tape backing.

The reverse side 21 of the plate 16 is shown as having locking tabs 22, 24 located towards the opposite ends of the longitudinal axis of the plate. In the illustrated form, the locking tabs are preferably integrally molded with the plate to realize further economies, but equivalent tabs could be variously fastened, bonded, or otherwise mounted to the reverse side of the plate. The plate is shown with cutouts 25, 26, corresponding generally to the dimensions of the tabs 22, 24.

Each of the locking tabs are shown in the form of angles. Locking tab or angle 22 has a yieldable arm 27 which lies in a plane substantially parallel to the plane of the plate 16. Likewise, locking tab or angle 24 has a yieldable arm 28 which is similarly disposed to the plate 16. Arms 22, 24 are joined to the reverse side of the plate by respectively, connecting arms 29 and 30. The angles are open towards the center, as shown, but they may be open towards the opposite ends. Locking spaces are provided between the yieldable arms and the reverse side of the plate. The locking tabs or angles are preloaded in the sense that the arms 27, 28 are yieldable away from the reverse side of the plate when spokes 13, 14 are captured within such locking spaces, which are so dimensioned that they are slightly smaller than the diameter of the bicycle spokes. Movement of the bicycle spokes into the space moves the yieldable arms away to effect frictional locking relationship of the spokes within the tabs.

A plurality of locking beads or projections 32 are shown integrally molded on yieldable arms 27, 28 so that such beads extend into the locking spaces. The beads are spaced apart a distance sufficient to capture a circumferential portion of the spoke as illustrated. This enhances the locking relationship in the locking spaces. The spoke is therefore captured between the yieldable arm, the back plate and adjoining beads. Aligned beads on each arm also provide adjustability in capturing the spokes at different positions towards the rim.

The illustrated reflector device is mounted by positioning the longitudinal axis of the plate so it intersects adjoining spokes 13 and 14 near the hub 12. The locking angles are outboard of the adjoining spokes near the hub, and the spokes 13, 14 enter the openings and are captured between the locking tabs and the plate as the reflector device is moved towards the rim. If the angles are open towards the opposite ends of the backer 16, the device is mounted by rotating from a position where the longitudinal axis is between the spokes to a position where the axis intersects the spokes.

The normal spacing of the yieldable arms 22, 24 to the reverse side of the plate has been increased by the spokes moving within the locking spaces. No particular dimensions are critical, but generally spokes have diameters of 0.040 – 0.060 inches; and it has been found operable to have the yieldable arms move away from the reverse side of the plate about 0.010 inches.

Non-elongated mounting plates may also be employed wherein locking tabs are provided at opposite sides or ends of such a plate. The non-elongated plate may be circular, square, hexgonal or the like, having the same area as the reflector, or otherwise. Such a plate is simply aligned between the adjacent tapered spokes with the locking tabs in position so that the locking spaces capture the adjacent spokes when the plate is moved towards the outer taper of the adjacent spokes, when using locking angles of the type illustrated herein.

Molding economies may prescribe that the reflector device may be integrally molded in that reflector element, mounting plate and locking ribs are all formed in the same molding process. In the alternative, only the mounting plate and locking tabs can be integrally molded, and the reflector element variously fastened or mounted to one or both sides of the plate. It is also possible for the locking tabs to be separately mounted, but this is not as desirable. The preferred and advantageous procedure is to integrally mold the mounting plate and locking tabs. Reflector elements are widely available, so it is an advantage to by-pass the expensive tooling associated with making such reflector elements. The same reflector elements which can be used for automotive vehicles, for example, can be mounted on the plate or backer. Such reflector elements are commonly available with or without double faced tape backing for mounting in this or other ways.

The reflector device shown in the views of FIGS. 7-10 has reflector elements mounted on opposite sides of the mounting plate or backer so that a single reflector device on a wheel can provide reflection from opposite sides. It will be understood, however, that reflector devices such as those previously described can be mounted on opposite sides of the same wheel to provide similar opposite side reflections.

The backer plate 36 is shown as having the same general configuration as previously described, including spaced locking tabs or angles 38 with spaced locking buttons 40. The substantially planar plate 36 has opposite annular mounting ribs 42 and 44 which are aligned and extend oppositely from the plate 36.

Figure 10:
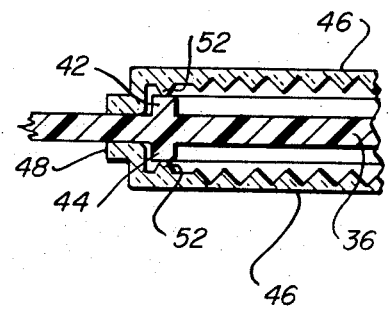
FIG. 10 is a view similar to that of FIG. 9, but showing the reflector elements bonded to the backer.

Similar reflector elements 36 are mounted to opposite sides of the plate 36. Each reflector element has an annular flange 48 with interior annular shoulder 50 which adjoins the outside of the annular ribs 42, 44. The inside of each reflector has an annular tapered sealing bead 52 positioned to contact the tops of the opposite ribs 42, 44. The tapered sealing beads represent the vibration locations when passing the plate under a sonic horn. The vibrations heat the plastic materials so the beads 52 are bonded to the tops of the annular ribs 42, 44 as shown in the view of FIG. 10. In a preferred form, the plastic material of the reflector melts at a higher temperature than the plastic material of the back plate so that the tapered sealing bead becomes embedded in the mounting rib.

Figure 11:
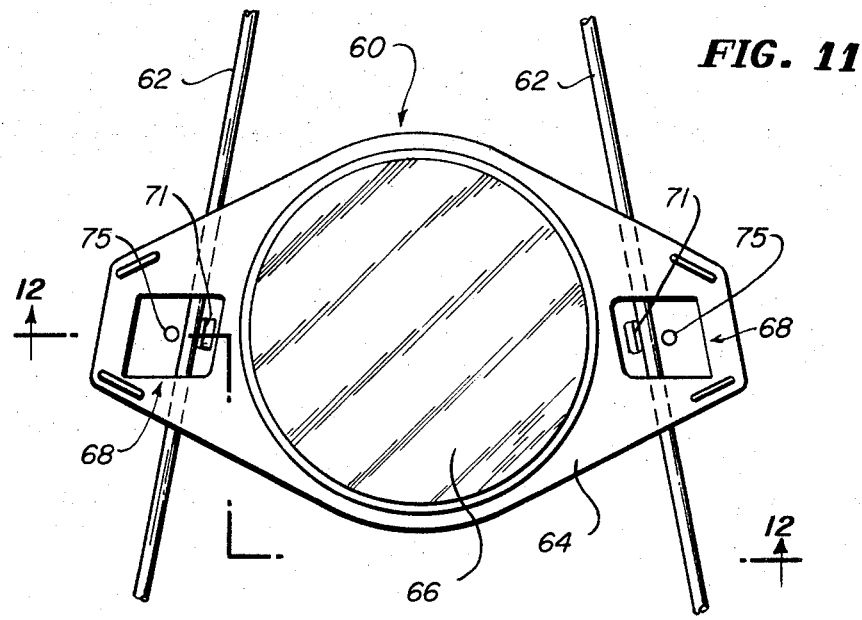
FIG. 11 is a front elevational view of a reflector device having locking tabs of alternative embodiment.
Figure 12:
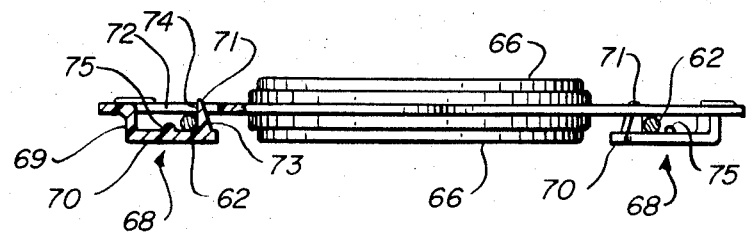
FIG. 12 is a sectional view taken along line 12—12 of FIG. 11.
Figure 13:
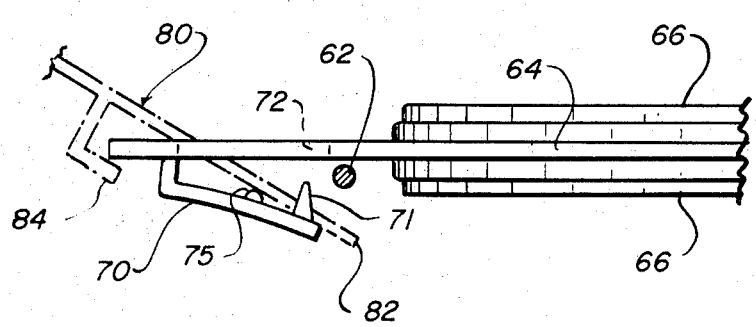
FIG. 13 is a proportional side elevational view illustrating a manipulative operation to release a locking tab.

The views of FIGS. 11–13 illustrate an embodiment wherein the locking tabs have an improved structure to discourage unauthorized removal of the reflector device, shown generally as 60 from adjacent spokes 62. The backer plate 64 has reflectors 66 mounted on both of the opposite sides through means such as those described in relation to the views of FIGS. 7-10. The backer plate with such double mounted reflectors can till be said to have an obverse and a reverse side. The locking tabs 68 have their locations conveniently identified by reference to the reverse side of the backer plate.

Each locking arm is shown integrally formed and in the configuration of an angle having a connecting arm 69 and a yieldable arm 70. The yieldable arm has a raised projection 71 which extends at least into recessed portion or cutout 72 of the back plate. The raised projection is shown with a leading tapered face 73 and an opposite vertical face 74. The raised projection 71 is positioned near the open end of the angle, and another lowered porjection 75 is shown spaced from the raised projection 71 a sufficient distance to accommodate spoke 62.

The reflector device just described is mounted by using a lever tool 80 to move the yieldable arm 70 so that riased projection into the space between the lowered projection 75 and the raised projection 71. The lever tool may be a simple screwdriver or the like. Preferably, the lever tool extends beyond the raised projection to more effectively displace the yieldable arm away from the reverse side of the backer plate. The lever tool 80 indicated in phantom, can be conveniently used, such tool formed from substantially rigid elongated rod material including an arm 82 and an affixed angle stop 84 which limits the lever action so that the yieldable arm is not broken through inadvertant overmanipulation. The tapered leading face of the raised projection 71 leads to easier entry of the raised projection into the recess and also can be used to facilitate contacting movement of the spoke with the raise projection during mounting. The trailing straight face is used to advantage to more securely position the spoke in the locking face between the lowered projection and the raised projection. Once the spoke is captured in the locking space, the reflector device cannot be demounted unless the raised projection is again withdrawn or removed from cutout 72 a sufficient distance to move the locking tab away from the spoke. The yieldable arm 70 is sufficiently rigid so it resists attempts to manually displace the yieldable arm a sufficient distance to allow release of the locking tab from the spoke. The lever tool is required, thus discouraging unauthorized removal of the reflector device from the spokes.

The trailing face 74 of the raised projection is shown as being vertical relative to the plane of the yieldable arm, and this face is disclosed to abut against the spokes when the device is mounted, see FIG. 11. It is therefore provided that the raised projections are canted so that the extending planes of the trailing straight faces converge towards the hub of the wheel. Suitable markings or indicia are preferably provided on the device (not shown) to orient the device to the rim and hub of the wheel to attain the desired converging cant of the raised projections relative to the hub. The locking tabs in all the embodiments are outboard of the spokes when the reflector device is positioned near the hub of the wheel. In practice, therefore, the spoke is positioned in each locking tab separately, preferably by engaging one spoke closer to the hub; and then moving the device towards the rim as the other locking tab is opened further to allow entry of the adjacent spoke as the device is moved further towards the rim.

The claims of the invention are now presented, and the terms of such claims are to be further understood by the language of the specification and the views of the drawings.

What is claimed is:

1. A reflector assembly for mounting to adjacent spokes of a bicycle wheel, said spokes diverging from the hub to the rim of the wheel, including a molded plastic plate, a reflector element mounted on said plate, said plate having an obverse side, said plate having a reverse side on which a spaced pair of frictional locking tabs are formed, each tab being an angle formed by a yieldable arm lying in a plane substantially parallel to the plane of the plate and a connecting arm joining said yieldable arm to the reverse side of said plate, each arm having an entry to receive one of an adjacent pair of spokes, a locking space between each yieldable arm and the reverse side of the plate, and said yieldable arm being normally spaced from said plate by said connecting arm a distance less than the diameter of said adjacent bicycle spoke, whereby the captured spoke in the locking space urges said yieldable arm away from the plate in frictional locking engagement.

2. A reflector assembly as in claim 1, wherein the reflector is on the obverse side and wherein a second reflector element is affixed to the reverse side of the plate.

3. A reflector assembly as in claim 1, wherein said locking tabs are integrally molded with said plate.

4. A reflector assembly as in claim 2, wherein said plate is elongated between said opposite ends, said locking tabs being open towards the center of the plate, whereby said tabs are outboard of adjacent spokes near the wheel hub and engage the spokes as the device is moved towards the wheel rim.

5. A reflector assembly as in claim 4 wherein a plurality of locking projections extend into each of the locking spaces, said projections being spaced apart a distance sufficient to capture a circumferential portion of the spokes.

6. A reflector assembly as in claim 1, wherein said plate and locking tabs are integrally molded plastic, and said reflector element is a separate unit mounted to the obverse side of said plate.

7. A reflector assembly as in claim 2, wherein said plate has annular mounting ribs formed on the obverse and reverse sides, and said reflector elements are mounted over said mounting ribs, the interiors of each of said reflector elements having annular sealing beads bonded to the tops of the opposite mounting ribs after exposure to sonic vibrations.

8. A reflector assembly as in claim 5 wherein said projections are integrally formed on each yieldable arm, each spoke being captured between adjoining projections on each arm.

9. A reflector assembly as in claim 8 which further includes a recessed portion in each backer plate opposite each of said yieldable arms, a projection on each of the yieldable arms adjacent the locking tab entry being raised and extending to the opposite recessed portion to normally close the locking tab entry, whereby said yieldable arm must be displaced sufficiently to remove the raised projection from the recessed portion and open the entry to allow introduction and removal of the spoke.

10. A reflector assembly as in claim 9 wherein the recessed portion is a cutout in the plate, said raised projection normally extending into said cutout, a lowered projection spaced from said raised projection to define a locking space between the projections on each yieldable arm, and said raised projection having a trailing straight face adjoining the locking space, said projections and striaght faces being canted so that the straight faces converge towards the hub of the wheel when the reflector device is mounted in correct orientation, whereby said straight faces abut the divergent adjacent spokes captured in the locking spaces.

* * * * *